P. S. ARNOLD.
GRINDING MACHINE.
APPLICATION FILED APR. 16, 1917.

1,351,409.

Patented Aug. 31, 1920.
5 SHEETS—SHEET 1.

Inventor:
PHILIP S. ARNOLD.
By Charles E. Niven
atty.

P. S. ARNOLD.
GRINDING MACHINE.
APPLICATION FILED APR. 16, 1917.

1,351,409.

Patented Aug. 31, 1920
5 SHEETS—SHEET 2.

INVENTOR
PHILIP S. ARNOLD

BY
Charles E. Wiener
ATTORNEY

P. S. ARNOLD.
GRINDING MACHINE.
APPLICATION FILED APR. 16, 1917.

1,351,409.

Patented Aug. 31, 1920.
5 SHEETS—SHEET 3.

INVENTOR
PHILIP S. ARNOLD

BY
ATTORNEY

UNITED STATES PATENT OFFICE.

PHILIP S. ARNOLD, OF HIGHLAND PARK, MICHIGAN, ASSIGNOR OF ONE-FIFTH TO CHARLES E. WISNER, OF DETROIT, MICHIGAN.

GRINDING-MACHINE.

1,351,409.  Specification of Letters Patent.  Patented Aug. 31, 1920.

Application filed April 16, 1917. Serial No. 162,278.

*To all whom it may concern:*

Be it known that I, PHILIP S. ARNOLD, a citizen of the United States, residing at Highland Park, county of Wayne, State of Michigan, have invented a certain new and useful Improvement in Grinding-Machines, and declare the following to be a full, clear, and exact description of the same, such as will enable others skilled in the art to which it pertains to make and use the same, reference being had to the accompanying drawings, which form a part of this specification.

This invention relates to automatic grinding machines, and its object is a machine for grinding circular objects such as shafts, cylinders and the like, that is automatically cut out of operation when the work has been ground to the desired diameter or degree. The fundamental object of the device is a caliper adapted to automatically throw the machine out of operation when the caliper points are allowed to approach each other a distance equal to the desired diameter of the work produced by grinding.

Another object of the invention is an automatic calipering device adapted to continuously engage the work during the grinding operation and means operating in conjunction therewith whereby upon the points attaining a distance equal to the desired diameter of the work produced by grinding, the machine is automatically stopped.

Another object of the invention is a calipering device of the character stated adapted to engage the work during the grinding operation, the work spacing the caliper points, and means whereby, when the calipers having approached each other to a distance equal to the desired diameter of the work produced by grinding, an electric contact is made and a circuit energized by means of which the grinding operation is discontinued, and a further object of the invention is involved in the means for adjusting the caliper for use on work of various diameters and in means for adjusting the setting of the contact making device. These and other objects and the several novel features of construction as well as the mechanism utilized to throw the machine out of operation and to again set it into operation, are hereinafter more fully described and claimed and shown in the accompanying drawings in which—

Fig. 2 is a similar view from the other end of the machine showing the parts while in operation.

Fig. 2$^a$ is a detail of the magnetic releasing device.

Fig. 5 is an enlarged side elevation of the automatic calipering device.

Fig. 6 is a plan view of the same.

Fig. 6$^a$ is an end view of a part of the caliper frame.

Similar characters refer to similar parts throughout the drawing and specification.

The machine consists of a base 1, of any approved character, provided with the usual head and tail stocks 2 and 3 respectively carried on a portion thereof, and movable longitudinally of the base is a table 4. On this table 4 is a second table 5 movable on the table 4 at right angles to the direction of movement thereof. This table 5 is arranged to carry the grinding wheel and mechanism for feeding the same toward and from the work. The table 5 is moved on the table 4 by means of a shaft 6 mounted on the table 5 provided with a gear 7 at the lower end meshing with a rack in the table 4. Ways 8 are provided in which the table 5 moves.

Figure 4:
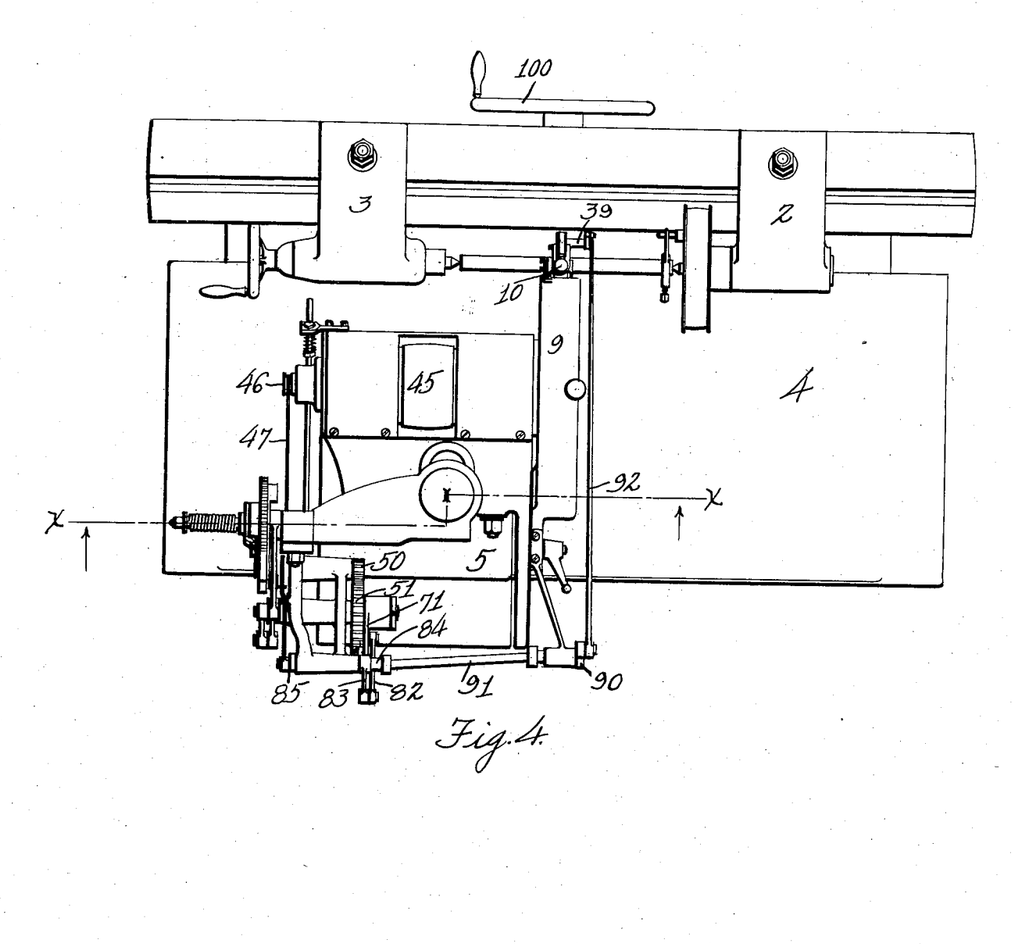
Fig. 4 is a plan view of the machine.

The work to be ground, as for instance a shaft as is shown in Fig. 4, is mounted in the usual manner between the head and tail stocks, and the table 5 is moved to bring the grinding wheel to the proper relative position therewith whereupon the grinding machine is set into operation. The said grinding wheel may be moved longitudinally of the shaft by movement of the table 4 on the bed or frame 1 in any approved manner.

Figures 5, 6, 6A:
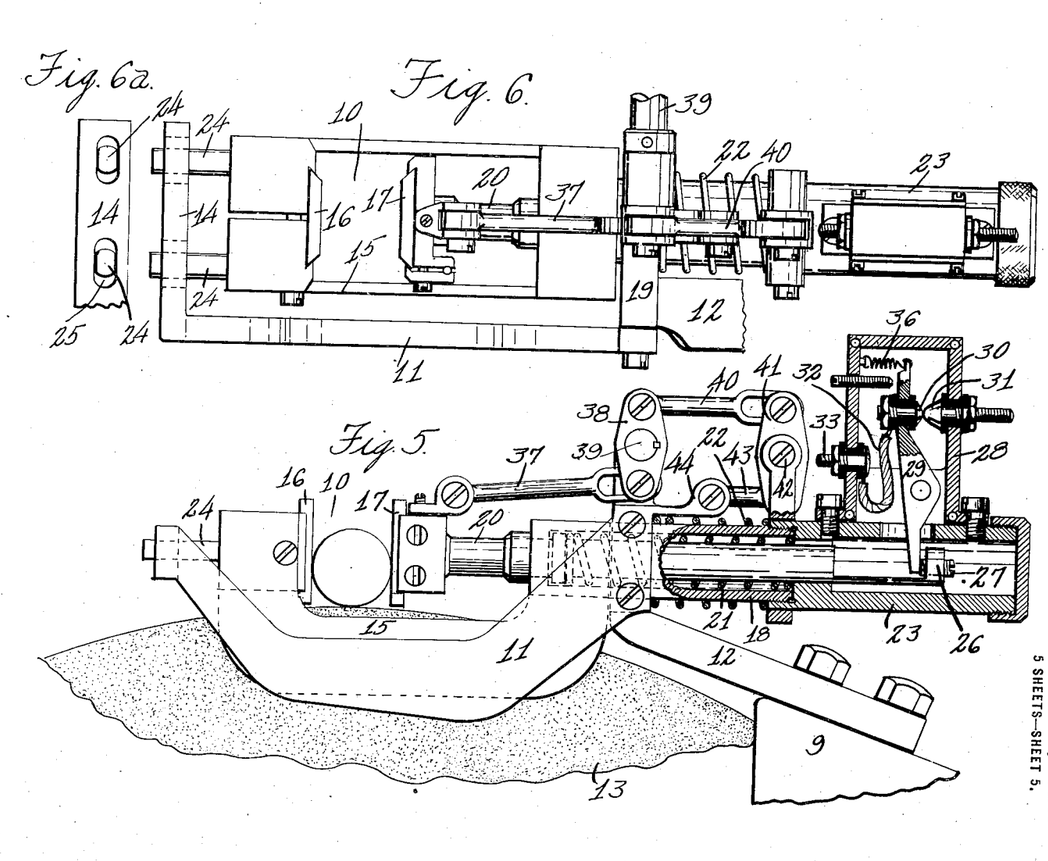

The grinding wheel is preferably partially inclosed by a case 9 and on this case or any convenient portion of the machine is a calipering device 10. This calipering device is shown more completely in detail in Figs. 5 and 6, from which it may be seen that the frame 11 thereof is supported by means of a bracket 12 on the casing 9 of the grinding wheel 13. The calipering device being mounted upon the casing 9 moves with the grinding wheel. The caliper proper is carried by the frame 11, which frame, as is shown in Fig. 6, has an end piece 14 and is attached to the part 12 at the opposite end. The parts 11, 12 and 14 are in fixed relation either being formed integrally or fixedly secured one to the other, and to the frame 9 of the grinding wheel. The caliper proper is movably mounted in this frame 11 and consists of the usual U shaped part 15 having a fixed anvil or point 16 at one end and a movable point or anvil 17 at the opposite end which has a plunger slidable in the hollow stem 18 extending through an aperture in the part 19 of the bracket 12. The hollow stem 18 is preferably formed as an integral part of the U shaped member 15 and is recessed to allow the plunger 20 to move longitudinally therein, and a spring 21 is provided about the plunger 20 within the stem 18 tending to force the plate or anvil 17 toward the fixed member 16. A spring 22 is also provided about the stem 18, engaging against the portion 19 of the frame and against a shoulder form by an attached extension 23 of the stem, which tends to move the anvil 16 and the frame 15 in a direction opposite to that of the tendency of the spring 21 on the plunger. The relatively fixed anvil 16 is also provided with a pair of studs 24 at the rear end passing through slots 25 in the bar 14 which allow the caliper frame 15 to be moved to an angle with the supporting frame 11. The aperture in the member 19, through which the stem 18 projects is of a form to allow a limited movement of the caliper frame 15 relative thereto. As the two caliper members 16 and 17 engage the work, which in its first shape when positioned in the machine may not be truly parallel with the axis of the grinding wheel or with the direction of longitudinal movement thereof, it is necessary that the frame 15 be mounted to move relative to the frame 11 to allow the anvils to follow the work without distortion of the frame. As the work becomes ground the anvils will assume normal position transversely of the work due to the action of the spring 22 and to the fact that the work will be ground cylindrical with an axis parallel with the axis of the grinding wheel. As will be understood from Fig. 6, the plates 16 and 17 which contact the work are preferably made removable and are made of hardened steel to reduce wear.

It is also to be noted that these anvils 16 and 17 are positioned to contact the work on that portion of the circumference being operated upon by the grinding wheel whereby the mechanism controlled by the calipers upon attaining the predetermined distance of spacing between the plates is actuated at the time the grinding wheel has reduced the work to the desired diameter.

Figure 1:
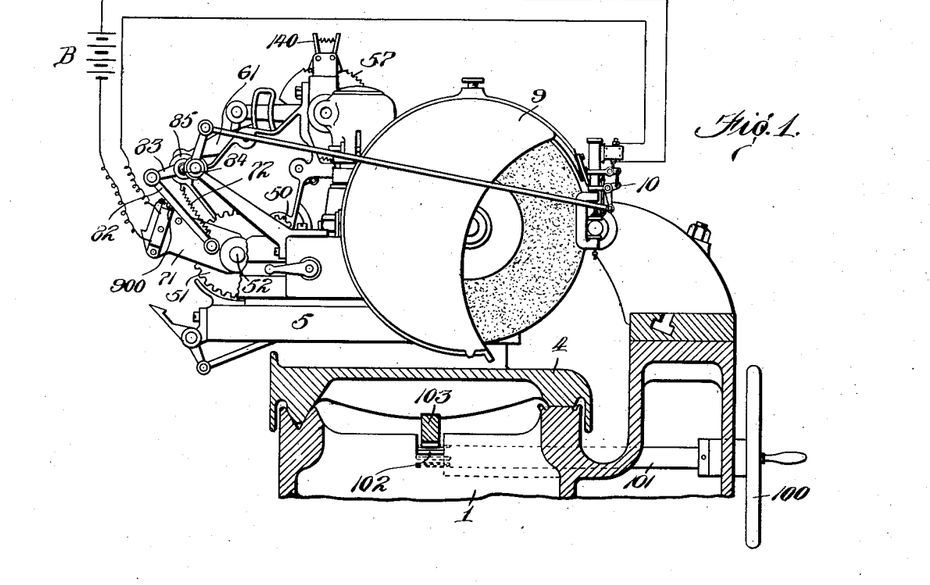
Figure 1 is an elevation partly in section of one end of the machine.
Figures 2, 2A:
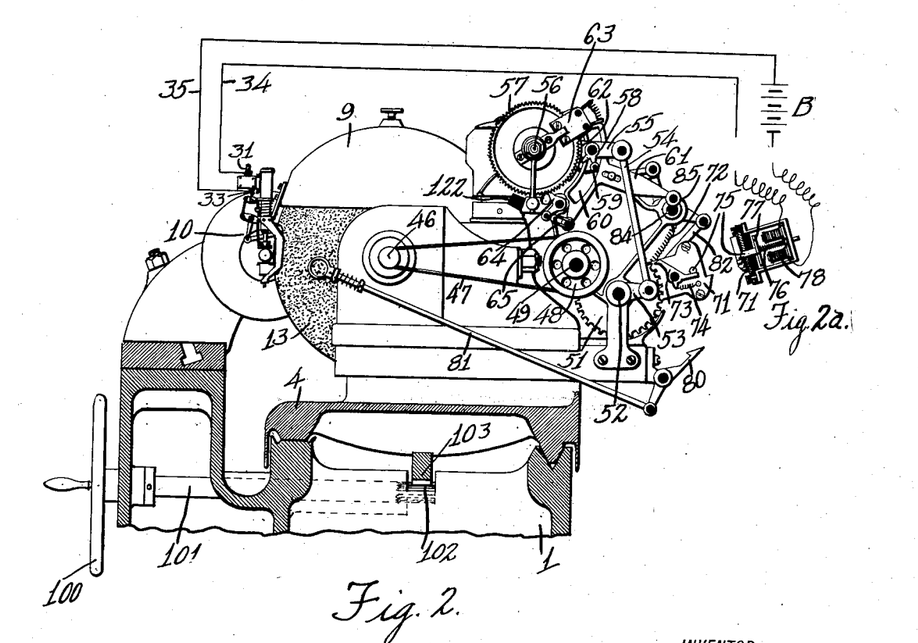

The extension 23 of the stem 18 is hollow, as shown in Fig. 5, and the plunger 20 terminates therein with a bent end 26 in which is a set screw 27 of any approved type. On this part 23 is a case 28 in which is pivotally mounted a lever 29 having an end projecting through an aperture in the said extension 23, which may be engaged by the end of the adjustable screw 27. The upper end of this lever 29 carries a contact 30 insulated from the lever. The case also carries a contact 31 insulated therefrom and adapted to be contacted by the point 30. This point 30 is connected by means of an insulated wire 32 with a stem 33 also insulated from the case, and connected with the stems 31 and 33 are electric wires 34 and 35 forming a circuit in which is located the battery B as indicated in Fig. 2. As the plunger 20 moves outwardly as the work is ground, the screw 27 engages the depending end of the lever 29 causing contact between the points 30 and 31, which releases the grinding wheel feeding mechanism as is hereinafter described. A spring 36 is provided tending to withdraw the point 30 from the contact with the point 31 when the plunger 20 and contact plate 17 is moved backward to position for insertion of a new piece of work and the grinding operation continues until the contact has been made between the points 30 and 31. By the adjustment of the screw 27 therefore, the time in which the mechanism will be cut out of operation may be accurately determined. In other words, the screw 27 is so positioned that when the contact between the points 30 and 31 takes place, the distance between the contact plates 16 and 17 is exactly equal to the diameter to which it is desired to grind the work.

Means is provided for retracting the contact plate 17 from the work and against the action of the spring 21, which consists of a pivoted rod 37 connected to the head of the plunger 20, as shown in Fig. 5, the opposite end being pivotally connected to a rock arm 38 mounted on a shaft 39 carried in a bearing supported by the member 19. As will be understood from Fig. 6, this shaft 39 projects to one side of the calipering device, and may be manually turned to rock the lever 38, or may be connected with mechanism to automatically rock the lever as is hereinafter described. The upper end of this rock arm 38 is connected by means of a pitman 40 with a similar rock arm 41 pivotally secured to a mounting 42 carried by the extension 23. This second rock arm 41 is pivotally connected at the bottom by means of a rod 43 to a stud 44 connected with the caliper frame. Thus when the rod 39 is rocked to retract the plunger 17 the case or stem is moved relatively toward the work compressing the spring 22 carrying the caliper yoke 15 moving the head 16 away from the work in the opposite direction from the movement of the plate 17. Thus on the completion of the grinding operation and contact being made by the points 30 and 31 under the automatic condition hereinafter described both plates 16 and 17 are drawn out of contact with the work at which time also the feeding of the grinding wheel onto the work is also stopped. Thus the jaws or contact plates 16 and 17 are positioned in such relation that the new work may be inserted between the head and tail stocks preparatory to a succeeding operation.

The mechanism by which the grinding wheel is fed toward the work during the grinding operation and mechanism controlled by the calipering device for stopping the feeding movement and returning the grinding wheel to original position for successive operation is shown more particularly in Figs. 1, 2, 3, 7 and 10. It is to be noted that the means for feeding the grinding wheel longitudinally of the work is here shown as a hand wheel 100 having a shaft 101 terminating in a gear 102 meshing with a rack 103 fixed to the grinding wheel table, and such mechanism or any other approved type of mechanism may be utilized for the purpose when required. With work of short lengths, longitudinal movement of the grinding wheel is unnecessary as a wheel may be used having a face of a width equal to the length of the work to be ground.

Figure 3:
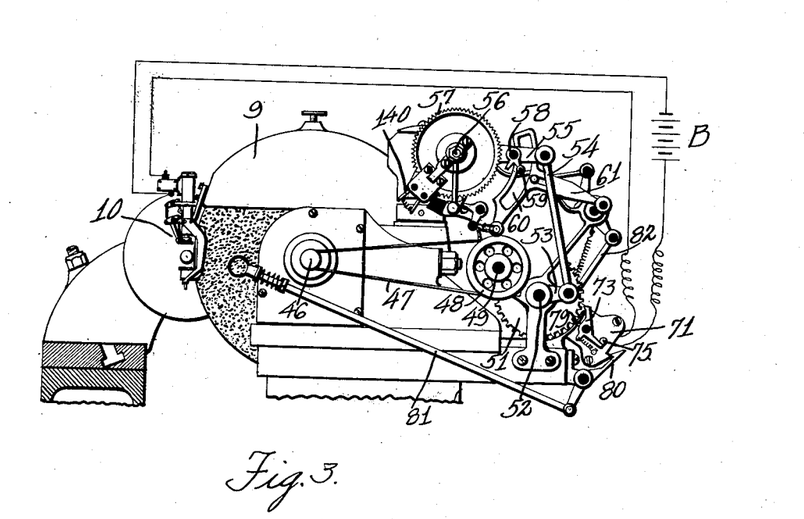
Fig. 3 is a similar view showing the parts in position when the machine is out of operation.
Figure 7:
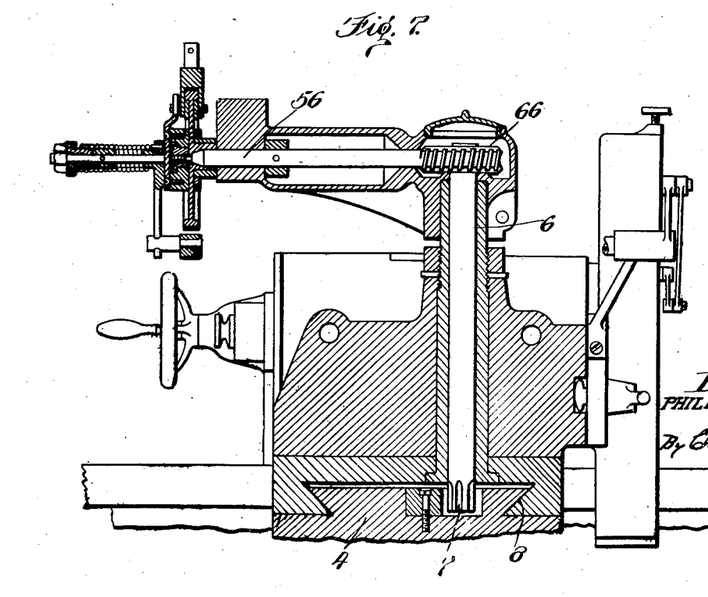
Fig. 7 is a vertical section taken on line $x-x$ of Fig. 4.

The general relation of the grinding wheel and work is shown in the plan view in Fig. 4 from which it will be understood that the grinding wheel may be independently rotated by means of the pulley 45 on the shaft on which the grinding wheel is located in the case 9. This shaft extends outwardly and on the opposite sides of the grinding wheel terminates in a pulley 46 connected by means of a belt 47 with a pulley 48 on a shaft 49, which shaft is, therefore, continuously rotated at a predetermined desired speed. As will be understood from Fig. 1, there is a gear wheel 50 on the said shaft 49 which meshes with a gear 51 on a shaft 52 carried on the grinding wheel head. The normal operating condition of the mechanism is shown in Fig. 2 where it may be seen that a crank 53 is provided on the end of the shaft 52 connected by means of a pitman 54 with an arm 55, which arm is mounted to turn on the shaft 56 of the feed gear or ratchet 57. A pawl 58 is pivotally mounted on the arm 55 having an end 59 riding in an arcuate slot 60 formed in the control plate 61 operated as hereinafter stated. In the position of the parts shown in Fig. 2, this pawl is held out of engagement with the ratchet 57 by a shield member running between the ratchet and pawl indicated by the heavy black line 62. This shield 62 is moved by a head 63 having a pair of pawls for engaging the teeth of the ratchet 57, as will be understood, whereby it may be fixedly positioned circumferentially relative to the ratchet. In starting the work, however, this head 63 occupies a position as shown in Fig. 3, at which time, with the plate 61 in position shown in Fig. 2, the pawl 58 is positioned to engage the teeth of the ratchet. Therefore, during each revolution of the shaft 52 the wheel 57 is turned a predetermined distance being held from backward rotation by a pawl 64 pivotally mounted on a convenient part of the frame. This pawl 64 has an arm extending therefrom pivotally connected by means of an arm 65 with the plate 61. During normal operation of the shaft 52, with the pawls 58 and 64 in engagement with ratchet wheel 57, the shaft 56 is intermittently turned. The shaft 56, as will be understood from Fig. 7, is provided with a worm on the end thereof meshing with a worm wheel 66 on the vertical shaft 6, and by means of this rotation the grinding wheel is automatically fed forward onto the work. It is, of course, to be understood that the grinding wheel is first properly positioned relative to the work by manual rotation of the ratchet wheel 57 and thereafter the feeding of the same onto the work is controlled by the automatic operation of the worm and worm wheel and ratchet wheel 57.

It is to be noted in Fig. 2 that a trip mechanism carried by the plate 71 is utilized. This plate 71 is pivotally supported on the shaft 52 independently of the revolution of the shaft and is normally held in the position shown in Fig. 1 by a spring 72, being stopped by a pin 900 engaging the arm 82. On this plate 71 is a dog 73 having one end adapted to engage the teeth of the gear 51. A spring 74 tends to force the dog into engagement with the teeth. This dog is provided with an extension engaging beneath the pin 75 which normally prevents the opposite end of the dog from engaging in the teeth of the gear. This pin 75 is held normally projecting through the plate 71 and into engagement with the end of the dog by a spring 76 thereon, as will be understood from Fig. 2ª. On the stem of this pin 75 is an armature 77. A pair of magnets 78 is supported in a case mounted on the rear side of the plate 71 and upon an electric current passing through the magnets and through the circuit wires 34 and 35, this pin 75 is withdrawn from engagement with the dog allowing the spring 74 to force the dog into engagement with the teeth of the gear 51. As the gear is rotating at this time, as is heretofore described, the dog carrying the plate 71 therewith is forced downward to a position shown in Fig. 3 at which point a shield 79 raises the point of the dog from engagement with the teeth. At the same time the plate is engaged at the end by the trip lever 80 pivotally mounted on the frame and manually operable by means of a spring restrained rod 81 extending toward the front of the machine. It is to be noted, particularly in Fig. 1, that this plate 71 has an arm 82 pivotally connected therewith, which, in turn, is connected by means of a crank 83 with a shaft 84. This shaft 84 has a crank 85 on one end thereof to which an end of the plate 61 is connected, which plate is provided with an arcuate slot 60 as heretofore mentioned, the plate being mounted on the frame and adapted to slide thereon toward and from the ratchet 57. By this downward movement of the plate 71, due to contact of the pawl 73 with the gear 51, the shaft 84 is rotated. Rotation of the shaft 84 pulls the plate 61 to the position shown in Fig. 3 and withdraws the pawls 58 and 64 from engagement with the ratchet 57 whereupon the continued rotation of the grinding wheel shafts 49 and 52 ceases to produce a feeding of the grinding wheel onto the work.

As will be understood from the foregoing, the circuits 34 and 35 become energized on contact of the points 30 and 31 which are moved into contact by reason of the caliper plates 16 and 17 attaining the desired distance apart, which is the predetermined diameter of the work desired. Therefore, if these caliper plates contact the work at the point of grinding, as soon as the work has attained the desired diameter, contact is made between the points 30 and 31 and the mechanism described ceases to feed the grinding wheel. When new work has been placed in the machine, by operation of the lever 81, the plate 71 is released to action by the spring 72 and this forces the arm 82 and the crank 83 to the position shown in Fig. 1. This movement sets the arcuate plate to position moving the dogs 58 and 64 into operative relation with the ratchet wheel. From Fig. 4 it can be seen that, on rotation of the shaft 84, a crank 90 thereon is turned, the shaft 84 being connected by means of an angular portion 91 and universal joints with the said crank. This crank 90 is connected by means of a rod 92 with the shaft 39 of the caliper device, which shaft is utilized in retracting the caliper plates from engagement with the work. Thus, upon the mechanism being operated to cease feeding the grinding wheel onto the work, the caliper plates are automatically withdrawn from engagement therewith to allow the insertion of new work between the head and tail stocks.

Figure 10:
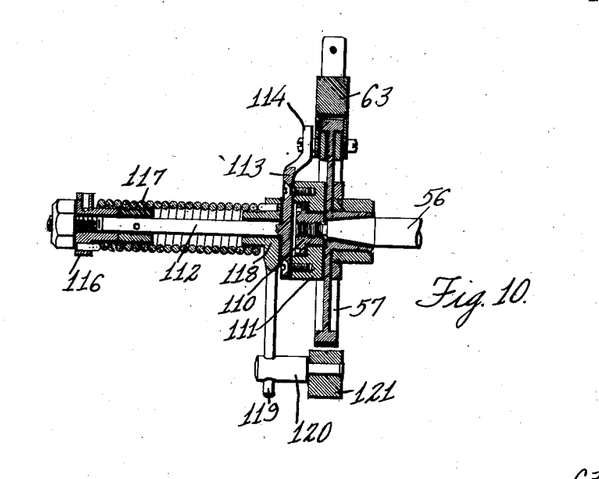
Fig. 10 is a vertical section of the feed wheel showing the means for automatically returning same to original position.

Simultaneously with the cessation of forward or feeding movement of the grinding wheel and release of the calipering device relative to the work, the grinding wheel is automatically retreated or moved backward relative to the work to allow a new piece to be inserted between the head and tail stocks. This is accomplished automatically by the mechanism shown more clearly in Figs. 7 and 10. In Fig. 10 it is to be seen that the ratchet wheel 57 is secured to the shaft 56 on which is a worm meshing with a worm wheel 66 on the vertical shaft 6 for moving the grinding wheel transversely of the bed. The end of the shaft 56 is threaded as shown and on the end thereof is a nut 110 having an enlarged head supporting a recessed block 111, which block is rotatable on the nut, the nut serving simply to position the same. A shaft 112 is provided, the axis of which is on the extended axis of the shaft 56 and this shaft 112, is provided with a base 113 fixedly secured to the block 111. This base 113 has an outwardly extending arm 114 extending between a pair of screws or pins on the pawl member 63 so that as the pawl is moved about the axis of the ratchet wheel the base member 113 and shaft 112 are rotated. On the outer end of the shaft 112 is a block 116 to which is attached one end of the coiled spring 117, the opposite end being attached to a block 118 in which the shaft 112 is rotatable. This block 118 is held from rotation by means of a stem 119 extending through a stud 120 secured to a stationary part 121 of the frame, which block is provided with a stop 122 against which the pawl member 63 engages as will be understood from Fig. 3. Thus, on movement of the ratchet wheel and rotation of the shaft 56 and feeding of the grinding wheel onto the work, the spring 117 is wound up producing tension. Upon release of the ratchet wheel, by raising the pawls 58 and 64 out of engagement therewith by the plate 61, the spring 117 reverses the direction of rotation of the ratchet wheel, and consequently the shaft 56, withdrawing the grinding wheel from the work in position to allow the new work to be introduced for a succeeding operation.

Figures 8, 9:
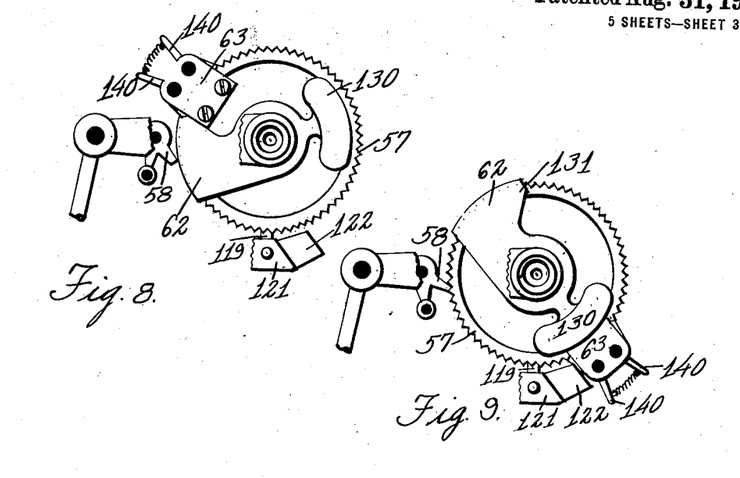
Figs. 8 and 9 are details of the ratchet mechanism for feeding the grinding wheel onto the work.

The shield 62, heretofore mentioned engaging between the pawl 58 and ratchet wheel, is shown more particularly in Figs. 8 and 9, where it will be seen that the shield is pivotally mounted upon the shaft of the ratchet wheel and is counter weighted by means of a weight 130 holding the shield away from the pawl 58 as will be understood from Fig. 9. The ratchet block 63, as hereinafter stated, is movable with the ratchet wheel 57 and it is to be understood that this block 63 is movable without contact with the counter weight beneath which it may readily pass. The shield 62, however, is provided with a portion 131 that may be engaged by the ratchet block as it is moved upward from the position shown in Fig. 9 into engagement with the part 131 as shown in Fig. 8. When this block 63 engages this portion of the shield further movement of the ratchet wheel by the operation of the mechanism forces the shield 62 beneath the pawl 58, whereupon the feeding movement of the ratchet wheel is stopped although the grinding wheel is still in contact with the work. The reason for this arrangement is to allow the grinding wheel to free itself of the work. As understood by persons familiar with this character of grinding operation, there is a certain give or spring of the various parts including the work to be ground, and if the grinding wheel is allowed to move across the work in fixed position without being fed onto the work a very thin cut is made as the parts are relieved of strain and rotation of the grinding wheel in fixed position, so far as transverse movement of the grinding wheel on the work is concerned, enables a finishing cut or polishing of the surface to be made.

It is to be noted that the shield 62 is introduced between the ratchet wheel and pawl before the caliper points have attained the predetermined distance apart. This is necessary when it is desired to hold the grinding wheel in position to make a polishing cut, but if the contact heretofore described had been made in the calipering device the grinding wheel would have been retracted from the work. Therefore, the pawl 63 is set on the ratchet wheel in the position as may be found proper with any particular character of work being ground to enable ratchet to feed the grinding wheel forward onto the work and to stop the feeding thereof just prior to the time the calipers will have come to a predetermined position or in which it just requires a polishing cut to bring the work to the desired size. By means of the spring controlled pawl levers 140 of the ratchet, this ratchet block may be set at any desired position to cause the shield 62 to stop the forward feeding of the wheel at the proper interval. When the contact has been made in the calipering device the pawl 64 is withdrawn from engagement with the ratchet wheel (the pawl 58 being already out of engagement with the shield), and the said ratchet wheel is then released to action by the spring 117 which simply returns the ratchet wheel to original position in which the spring is neutral (or if under tension into engagement with the stop 122), at each operation for articles of the same character and only requires a resetting when work requiring more or less grinding is introduced into the machine.

The shield member 62 is to be used only in the event that a polishing cut, as above described, is necessary in finishing the work, and so far as reducing the work to the desired diameter is concerned the shield may be entirely dispensed with without affecting the operation of the machine as the grinding wheel would simply be fed toward the work until it has been ground to a desired diameter as is determined by the setting of the calipering device to produce the electrical contact described. The pawls 58 and 64 are thereupon immediately withdrawn from the ratchet wheel and the grinding wheel withdrawn by reason of the operation of the spring 117.

Usually the spring 117 is normally under tension so that the block 63 carrying the pawls is in position shown in Fig. 3 at the beginning of the grinding operation whether the shield 62 may be used or not, as the said pawls are required in the winding up of the spring forming a connection between the ratchet wheel and the shaft 112.

From the foregoing description it becomes evident that the machine principally by reason of use of the automatic caliper and mechanism operating in conjunction therewith is automatic in its operation, the only requirement being that the workman take the finished work from the machine and place new work therein. From this point the machine proceeds with the grinding operation being moved longitudinally of the work if necessary in any approved manner, is automatically fed onto the work and when the grinding operation has been completed the machine is returned to original position to receive new work. In this manner the several objects of the invention may be secured.

Having thus briefly described my invention, its utility and mode of operation what I claim and desire to secure by Letters Patent of the United States is—

1. In a grinding machine, means for grinding a piece of work to reduce the diameter thereof, electrically controlled means adapted to cause cessation of the grinding operation, and a calipering device having parts riding in yieldable contact with diametrically opposite sides of the work adapted to close the circuit for said electrically controlled means upon attaining a predetermined distance apart.

2. In a grinding machine, means for grinding a piece of work to reduce the diameter thereof, electrically controlled feeding mechanism therefor, a calipering device having parts yieldably engaging diametrically opposite sides of the work adapted upon the parts approaching a predetermined distance apart to close the electric circuit for the feeding mechanism.

3. In a grinding machine, a grinding wheel, electrically controlled mechanism for feeding the wheel toward the work to grind the same, an electric circuit therefor, the arrangement being such that the closing of the circuit causes cessation of operation of the feeding mechanism, and a calipering device having parts yieldably engaging diametrically opposite sides of the work and spaced apart thereby adapted to close the electric circuit upon attainment of a predetermined distance apart.

4. In a grinding machine, a grinding wheel, electrically controlled mechanism for feeding the wheel toward the work during the grinding operation, a calipering device having parts continuously engaging diametrically opposite sides of the work during the grinding operation, mechanism adapted to cause cessation of operation of the feeding mechanism prior to the time the caliper parts have attained a predetermined distance apart, electrically controlled means for causing cessation of operation of the said feeding mechanism, the said caliper parts closing the circuit to produce cessation of operation of the said feeding mechanism upon attainment of a predetermined distance apart, and automatic means for reversing the said mechanism brought into operation upon closing of the circuit.

5. In a grinding machine, work supporting means, a grinding wheel movable longitudinally of the work during the grinding operation, means for feeding the grinding wheel transversely of the work to reduce the diameter thereof, means for causing cessation of the transverse feeding movement, and an automatic calipering device controlling the operation of said cessation causing means, the calipering device having movable elements spaced apart by the work adapted, upon the elements becoming spaced a predetermined distance apart, to cause actuation of said cessation causing means.

6. In a grinding machine, means for supporting the work, a grinding wheel movable toward the work to reduce the diameter thereof, means for feeding the wheel longitudinally of the work during the grinding operation, a calipering device having movable parts continuously engaging diametrically opposite sides of the work, and means, actuated upon the said parts attaining a predetermined distance apart, for causing a movement of the wheel away from the work and simultaneously respacing the said movable parts of the calipering device.

7. In a grinding machine, means for supporting the work, a grinding wheel, feeding mechanism for moving the wheel toward the work to reduce the diameter thereof, said mechanism including a ratchet wheel, pawls for engaging the wheel, and mechanism for operating the pawls to rotate the ratchet to cause the grinding wheel to move toward the work, a spring wound up by the said feeding movement of the ratchet wheel, a calipering device having parts continuously engaging the work, and means controlled by the said parts upon the said parts attaining a predetermined distance apart causing withdrawal of the pawls from the ratchet wheel and releasing the same to reverse rotation by the said spring.

8. In a grinding machine, means for holding the work, a grinding wheel, feeding mechanism for moving the wheel onto the work to reduce the diameter thereof, said means including a ratchet wheel and pawls engaging the wheel and means for moving the pawls to produce rotation of the ratchet wheel, a spring wound up by the said rotation of the ratchet wheel adapted when released to return the ratchet wheel to original position and withdraw the grinding wheel from engagement with the work, an electrically controlled lever for withdrawing the pawls, a calipering device having parts or points spaced apart by the work, a circuit for the said electrical device whereby the said lever may be released upon energization thereof, and a contact member adapted to close the electrical circuit when the movable parts or points of the calipering device become spaced a predetermined distance apart.

9. In a grinding machine, means for grinding a piece of work to reduce the diameter thereof, means spring-supported in contact with diametrically opposite sides of the work, electrically controlled means for causing cessation of the grinding operation, and a circuit for said means closed by the said parts contacting the work upon attaining a predetermined distance apart.

10. In a grinding machine, a grinding wheel, means for moving the wheel toward the work to reduce the diameter thereof, electrical means controlling the said operation to produce cessation of the same, a circuit therefor and a calipering device adapted to energize the circuit consisting of relatively fixed and a relatively movable part engaging opposite sides of the work, a spring for holding the movable part in engagement with the work, a contact member adapted to close the circuit when the said fixed and movable part of the caliper have attained a predetermined distance apart.

11. In a grinding machine provided with a grinding wheel adapted to be fed onto the work to reduce the diameter thereof, mechanism for producing the said movement of the wheel including a ratchet, pawls for rotating the ratchet and means for withdrawing the pawls from the ratchet to produce cessation of the feeding movement, electrical means controlling the withdrawal, means, a circuit for said electrical means, a calipering device having a fixed and a movable plate continuously engaging the work, a spring for holding the movable plate in engagement with the work, a lever having a contact point connected with the circuit of the electrical means, said lever being controlled by the movable plate, movement of the lever being adapted to close the circuit for the electric means, an adjustable means for setting the caliper to close the circuit when the relatively fixed and movable plates have become spaced a predetermined distance apart.

12. In a grinding machine, a grinding wheel, mechanism for feeding the wheel onto the work to reduce the diameter thereof including a ratchet wheel and a spring wound up by forward rotation of the ratchet to feed the grinding wheel, an electrically controlled means for releasing the ratchet wheel to action by the spring to cause reverse rotation thereof and withdraw the wheel from the work, and a calipering device having movable parts continuously engaging the work adapted to energize the circuit of the electrical device when the plates have become spaced a predetermined distance apart.

13. In a grinding machine, a grinding wheel movable toward the work to reduce the diameter thereof, means for moving the wheel toward or from the work including a ratchet, electrically controlled means for rotating the ratchet to feed the grinding wheel, a circuit therefor, a spring wound up by forward rotation of the ratchet adapted to reverse the direction of rotation thereof when released, a calipering device having movable parts spaced by the work adapted upon the parts attaining a predetermined distance apart to energize the circuit of the electrically controlled means and release the ratchet to action by the spring, and means whereby the mechanism for releasing the ratchet wheel automatically respaces the said movable parts of the calipering device for operation upon new work.

14. In a grinding machine, a grinding wheel movable toward the work to reduce the diameter thereof, mechanism for so moving the grinding wheel, electrically controlled means for producing cessation of operation of the feeding mechanism, a spring for automatically reversing the feeding mechanism, a calipering device, a frame in fixed relation with the grinding wheel, carrying the caliper, said caliper having a U shaped frame yieldably supported in the fixed frame, a contact plate for engaging the work carried by a fixed part of the U frame, a relatively movable plate for engaging the work upon opposite sides from the said fixed plate, a plunger attached to movable plate, an extension on the U frame, in which the plunger rides, a spring on the said plunger forcing the movable plate into engagement with the work, a spring on the said extension for forcing the relatively fixed plate in an opposite direction to contact the work, means for withdrawing the plunger in the stem and simultaneously moving the stem to force the fixed plate in the opposite direction out of contact with the work, said means being connected with the electrically controlled means whereby upon said controlled means being operated to cause cessation of the feeding movement and subsequent operation of the spring to reverse the operation of the feeding mechanism, the caliper plates and retreated from engagement with the work a distance to accommodate new work, and an electric circuit for the said electrically controlled means adapted to be energized when the said relatively fixed and movable plates attain a predetermined distance apart.

15. In a grinding machine for grinding a piece of work to reduce the diameter thereof, a calipering device having a pair of members yieldably engaging opposite sides of the work respectively during the grinding operation, electrical means for controlling the grinding operation, a circuit for energization thereof, and a contact actuated to close the circuit by the members engaging the work upon attaining a predetermined distance apart.

In testimony whereof I sign this specification.

PHILIP S. ARNOLD.